US012604372B2

(12) United States Patent
Son

(10) Patent No.: US 12,604,372 B2
(45) Date of Patent: Apr. 14, 2026

(54) ELECTRIC RANGE ADJUSTING HEAT POWER BASED ON PROPERTIES OF HEATING TARGET

(71) Applicant: LG ELECTRONICS INC., Seoul (KR)

(72) Inventor: Howon Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 962 days.

(21) Appl. No.: 17/789,267

(22) PCT Filed: Sep. 10, 2020

(86) PCT No.: PCT/KR2020/012216
§ 371 (c)(1),
(2) Date: Jun. 27, 2022

(87) PCT Pub. No.: WO2021/132843
PCT Pub. Date: Jul. 1, 2021

(65) Prior Publication Data
US 2023/0048201 A1 Feb. 16, 2023

(30) Foreign Application Priority Data

Dec. 27, 2019 (KR) ........................ 10-2019-0175985

(51) Int. Cl.
*H05B 6/06* (2006.01)
*G01G 19/52* (2006.01)
*H05B 6/12* (2006.01)

(52) U.S. Cl.
CPC ............. *H05B 6/065* (2013.01); *G01G 19/52* (2013.01); *H05B 2213/03* (2013.01); *H05B 2213/05* (2013.01)

(58) Field of Classification Search
CPC ........ F24C 15/105; F24C 7/083; F24C 7/087; F24C 15/106; F24C 7/082; G01G 19/52;
(Continued)

(56) References Cited

U.S. PATENT DOCUMENTS 9,277,598 B2 * 3/2016 Lee ...................... H05B 6/1272
2014/0076886 A1 3/2014 Stella et al.
2016/0299595 A1 * 10/2016 Bach ........................ F24C 7/086

FOREIGN PATENT DOCUMENTS

DE 10 2016 217 783 3/2018
JP H09210368 A * 8/1997
(Continued)

OTHER PUBLICATIONS

Translation of DE102016217783A1, "A method for operating a hob", Mar. 22, 2018, By WIPO (Year: 2018).*
(Continued)

*Primary Examiner* — Quang T Van
(74) *Attorney, Agent, or Firm* — KED & ASSOCIATES

(57) ABSTRACT

Disclosed is an electric range controlling heat power based on properties of a heating target. The electric range may adjust the heat power based on the properties of the heating target, when a user makes a gesture of moving the heating target in a specific direction. A unit decrease amount value of the heat power sequentially decreasing may be set based on the information related to the heating target. The information related to the heating target may include at least one of the weight of the heating target, the size of the bottom surface of the heating target or the property of contents contained in the heating target.

13 Claims, 9 Drawing Sheets

1

(58) Field of Classification Search
CPC ............ H05B 2213/03; H05B 2213/05; H05B
6/065; Y02B 40/00
USPC ........ 219/621, 620, 622, 625, 626, 627, 635
See application file for complete search history.

(56) References Cited

FOREIGN PATENT DOCUMENTS

| | | |
|---|---|---|
| JP | 2009-238613 | 10/2009 |
| JP | 2012-000229 | 1/2012 |
| JP | 2014-044822 | 3/2014 |
| KR | 10-2017-0113111 | 10/2017 |
| KR | 10-2018-0015972 | 2/2018 |
| KR | 10-2019-0112981 | 10/2019 |

OTHER PUBLICATIONS

European Search Report issued in Application No. 20907659.5 dated Dec. 4, 2023.
International Search Report (with English Translation) dated Dec. 15, 2020 issued in PCT Application No. PCT/KR2020/012216.
Korean Office Action issued in Application No. 10-2019-0175985 dated Mar. 25, 2024.

* cited by examiner

Figure 6:
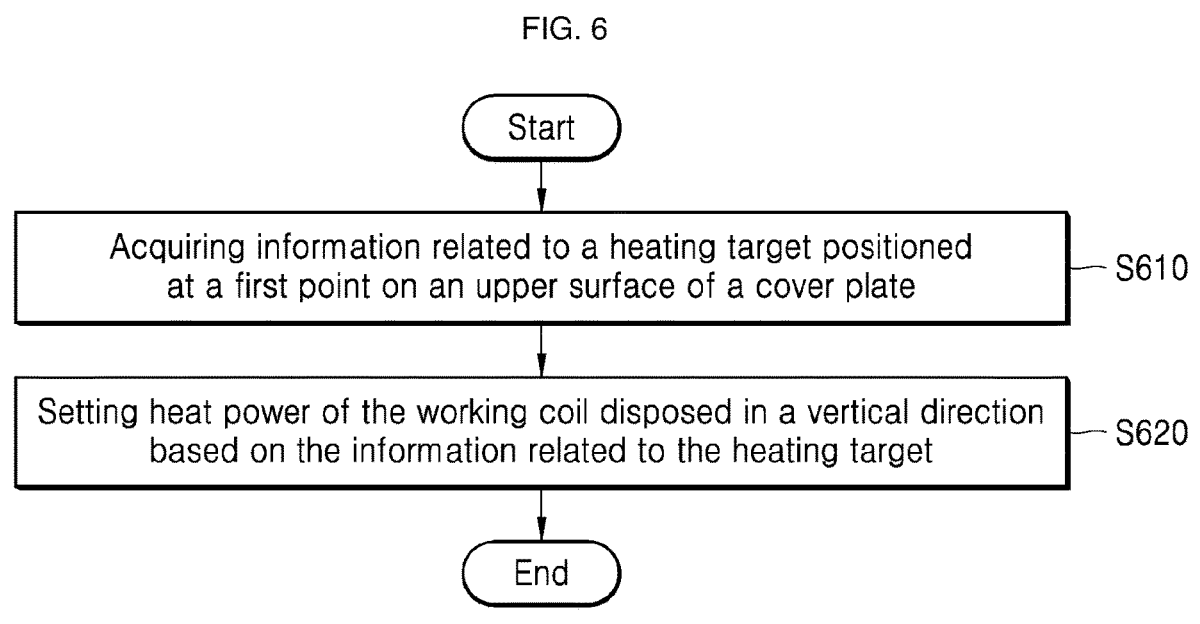

Start

Acquiring information related to a heating target positioned
at a first point on an upper surface of a cover plate ── S610

Setting heat power of the working coil disposed in a vertical direction
based on the information related to the heating target ── S620

End

FIG. 7 setting (a)

(b)

(a)

(b)

ELECTRIC RANGE ADJUSTING HEAT POWER BASED ON PROPERTIES OF HEATING TARGET

CROSS-REFERENCE TO RELATED PATENT APPLICATIONS

This application is a U.S. National Stage Application under 35 U.S.C. § 371 of PCT Application No. PCT/KR2020/012216, filed Sep. 10, 2020, which claims priority to Korean Patent Application No. 10-2019-0175985, filed Dec. 27, 2019, whose entire disclosures are hereby incorporated by reference.

BACKGROUND

Technical Field

The present disclosure relates to an electric range that may adjust heat power based on properties of a heating target.

Background Art

Various types of cooking utensils are used to heat food at home or in a restaurant. The cooking utensils or appliances may include a gas range using gas and an electric range using electricity.

An electric range may be largely classified into a resistance heating type and an induction heating type. An electrical resistance type may generate heat by applying a current to a non-metallic heating element such as a metal resistance wire and silicon carbide, and may heat an object (e.g., a cooking vessel or container such as a pot or a frying fan) by radiating or conducting the generated heat. An induction heating type may apply high-frequency power to a coil and generate a magnetic field around the coil, and may heat a heating target made of a metal material by using an eddy current generated in the magnetic field.

A gas range may control a heat power by manipulation of a knob, and an electric range may control heat power by a touch manipulation. However, compared to the knob manipulation, the touch manipulation has a disadvantage in that it is not possible to quickly adjust the heat power As one example, if the contents in the cooking vessel or container boil over or become extremely heated, a user using the gas stove or gas range can quickly power the heat by rotating the knob or handle. However, a user using the electric range has to repeatedly perform a touch manipulation for adjusting the heat power, so it is impossible to quickly lower the heat.

DESCRIPTION OF DISCLOSURE

Technical Problems

Accordingly, an object of the present disclosure is to address the above-noted and other problems and to provide an electric range that may quickly adjust a heat power.

A further object of the present disclosure is to provide an electric range that may allow a user to quickly solve an emergency situation by minimal manipulation even if an emergency situation occurs during heating and cooking.

A still further object of the present disclosure is to provide an electric range that may efficiently supply a desired level of a heat power to a user based on the weight and size of a heating target and a type of food to be cooked.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

Technical Solutions

An electric range according to the present disclosure may adjust heat power based on properties of a heating target when a user makes a gesture of moving a heating target in a specific direction. At this time, a unit decrease value of a sequentially decreased heat power may be set based on information related to a heating target. The information related to the heating target may include at least one of the weight of the heating target, the size of a bottom surface of the heating target or properties of contents contained in the heating target.

An electric range according to an embodiment may include a case; a cover plate coupled to an upper side of the case and having an upper surface on which a heating target is disposed; a heating module disposed inside the case and configured to heat the heating target; and a controller configure to control the heating module, the heating target may be positioned at a first point on an upper surface of the cover plate and the first point is positioned in a first direction on the upper surface of cover plate, the controller may set heat power of the heating module disposed in the first direction based on information related to the heating target. The information related to the heating target may include at least of the weight of the heating target, the size of the bottom surface of the heating target or properties of contents contained in the heating target.

An electric range according to another embodiment of the present disclosure may include a case; a cover plate coupled to an upper side of the case and having an upper surface on which a heating target is disposed; a heating module disposed inside the case and configured to heat the heating target; and a controller configure to control the heating module. The heating target may be positioned at a first point on an upper surface of the cover plate and heated by the heating module disposed at the first point, and when the heating target is moved to a second point from the first point on the upper surface of the cover plate, the controller may set heat power of the heating module disposed at the second point based on information related to heat power of the heating module disposed at the first point, a distance between the first point and the second point and information related to the heating target. The information related to the heating target may include at least one of the weight of the heating target, the size of the bottom surface of the heating target or the property of contents contained in the heating target.

A method of controlling an electric range according to a further embodiment of the present disclosure may include steps of a controller acquiring information related to a heating target positioned at a first point on an upper surface of a cover plate; and the controller setting heat power of a heating module disposed in a first direction including the first point. The information related to the heating target may include at least one of the weight of the heating target, the size of the bottom surface of the heating target or a property of contents contained in the heating target.

Advantageous Effect

The electric range according to the present disclosure may have following advantageous effects. The electric range may quickly adjust a heat power.

In addition, the electric range may allow the user to quickly resolve an emergency by the minimal manipulation even in the event of an emergency in the process of heating and cooking.

In addition, the electric range may efficiently supply a desired level of a heat power to a user based on the weight and size of a heating target and a type of food to be cooked.

Specific effects are described along with the above-described effects in the section of Detailed Description.

BRIEF DESCRIPTION OF DRAWINGS

FIG. 6 is a flow chart of a method for controlling an induction heating device configured to set a heat power of a working coil according to an embodiment; and FIGS. 7 to 9 are views to describe a concept of setting a heat power of a working coil disposed in a vertical direction according to an embodiment.

BEST MODE

Figure 1:
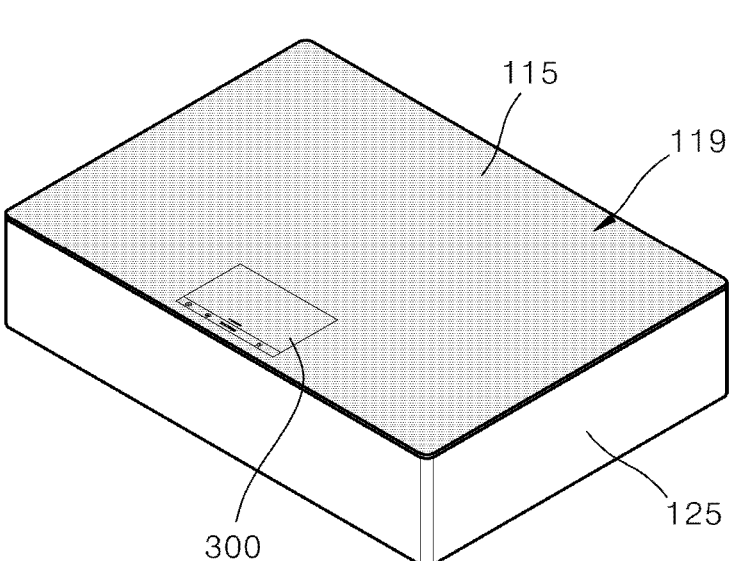
FIG. 1 is a perspective view of a zone-free type induction heating device according to an embodiment of the present disclosure.

The above-described aspects, features and advantages are specifically described hereunder with reference to the accompanying drawings such that one having ordinary skill in the art to which the present disclosure pertains can easily implement the technical spirit of the disclosure. In the disclosure, detailed descriptions of known technologies in relation to the disclosure are omitted if they are deemed to make the gist of the disclosure unnecessarily vague. Below, preferred embodiments according to the disclosure are specifically described with reference to the accompanying drawings. In the drawings, identical reference numerals can denote identical or similar components.

Hereinafter, an electric range according to several embodiments of the present disclosure will be described. Below, preferred embodiments according to the disclosure are specifically described with reference to the accompanying drawings. In the drawings, identical reference numerals can denote identical or similar components.

The electric range described herewith is a concept including both the resistance type electric range and the induction heating type electric range (i.e., an induction heating device). For convenience of description, an embodiment of the present disclosure will be mainly described with respect to a zone-free type induction heating device. However, the present disclosure may not be limited thereto. In particular, the present disclosure may be applicable to other type induction heating devices (e.g., a flex type, a half flex type, a dual type, etc.) other than the electric resistance type electric range and the zone-free type induction heating device.

Figure 2:
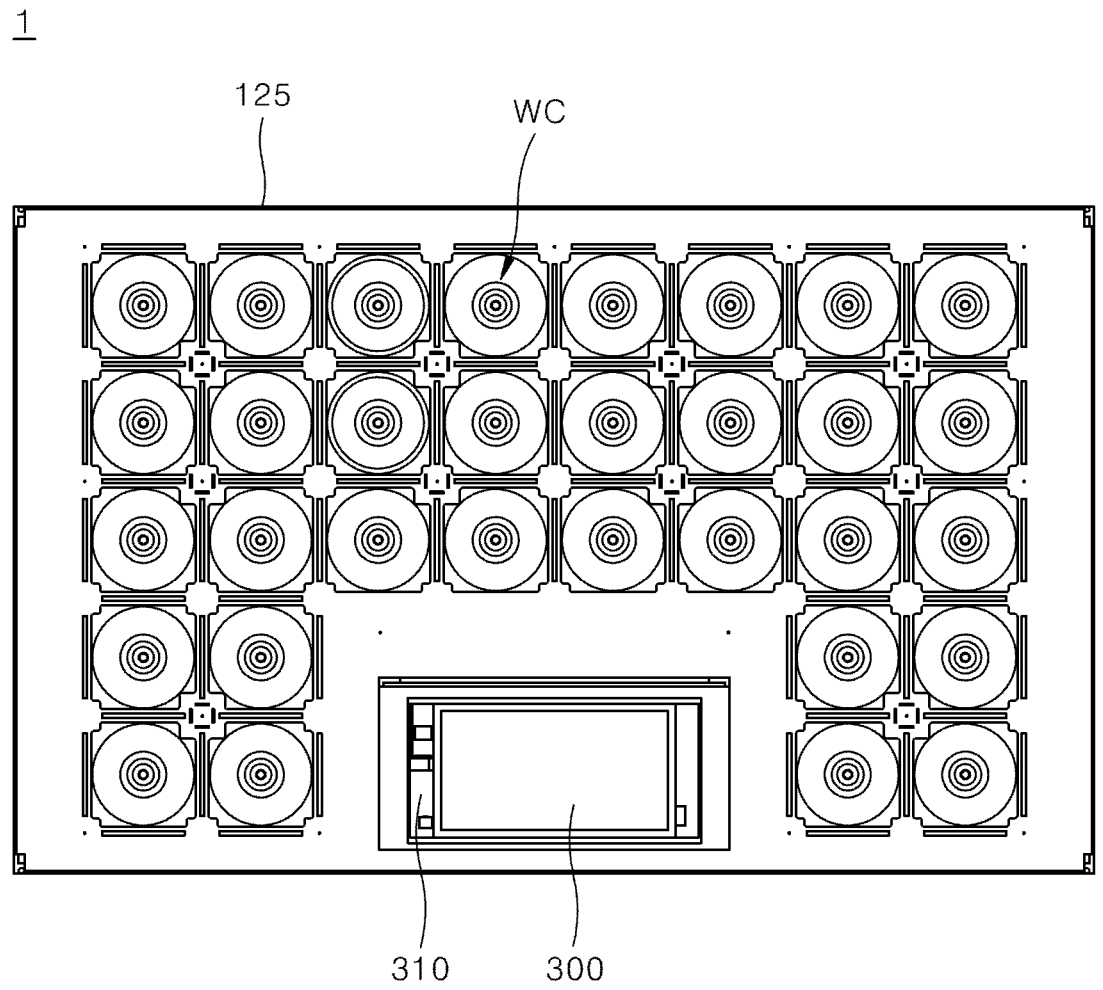
FIG. 2 is a plane view showing a state where some components of FIG. 1 are omitted.
Figure 3:
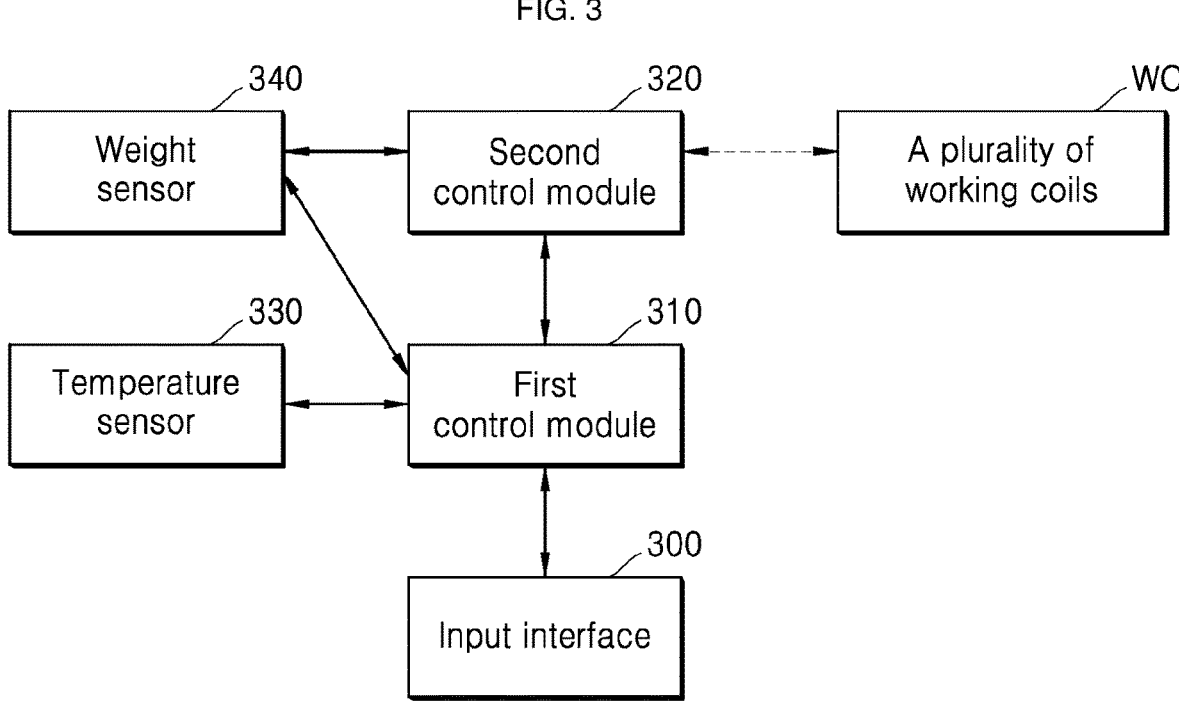
FIG. 3 is a view schematically showing control flow of the zone-free type induction heating device shown in FIG. 1.

FIG. 1 is a perspective view of a zone-free type induction heating device according to an embodiment of the present disclosure. FIG. 2 is a plane view of FIG. 1 with some omitted elements. FIG. 3 is a view schematically showing control flow of the zone-free type induction heating device shown in FIG. 1.

For reference, FIG. 2 is a view in which a cover plate 119 of FIG. 1 is omitted for convenience of description.

Referring to FIGS. 1 to 3, an induction heating device 1 according to an embodiment of the present disclosure may include a case 125, a cover plate 119, an input interface 300, a first control module 310, a second control module 320, a temperature sensor 330, a weight sensor 340 and a plurality of working coils WC. The temperature sensor 330 and the weight sensor 340 may constitute a sensor unit.

Although not shown in the drawings, in the case 125 may be disposed various components that constituting the induction heating device 1 including a base plate on which the working coils WC are disposed, an indicator substrate support module on which an indicator substrate is mounted, a plurality of light emitting elements disposed on the indicator substrate, an indicator substrate configured to control driving of the plurality of light emitting elements, a light guide configured to display the light emitted from the light emitting elements through a light emitting surface, and a blower fan configured to cool the heat generated from the plurality of light emitting elements, in addition to the plurality of working coils WC.

Also, in the case may be mounted various devices related to the driving of the working coils WC such as a power supply unit configured to supply AC power, a rectifier configured to rectify the AC power of the power supply unit into DC power, an inverter configured to convert the DC power rectified by the rectifier into a resonance current through a switching operation and provide it to the working coils WC, a second control module 320 configured to control the inverter and components related to driving of the inverter, a relay or semiconductor switch configured to turn on or off the working coils WC, etc., detailed description thereof will be omitted.

The case 125 may be insulated to prevent heat generated by the working coil WC from leaking to the outside.

Meanwhile, the cover plate 119 may be coupled to an upper side of the case 125 to shield the inside of the case 125, and a heating target (not shown, that is, an object heated by at least one of the plurality of working coils WC) may be disposed on an upper surface of the cover plate 119.

Specifically, the cover plate 119 may include an upper plate 115 on which a heating target (e.g., a cooking vessel or container) is placed. The heat generated from the working coil WC may be transmitted to the heating target through the upper plate 115.

In this instance, the upper plate 115 may be made of glass, for example. The input interface 300 configured to receive and transmit a user's input to the first control module 310 may be mounted on the upper plate 115. The first control module 310 may be a controller configured to control the input interface 300.

The input interface 300 may be installed so as to be flatly embedded in an upper surface of the cover plate 119, that is, installed flat on the same plane as the top plate 115, and may display a specific image. The input interface 300 may be configured to receive the user's touch input and transmit the received touch input to the first control module 310.

Specifically, the input interface 300 may be a module for allowing the user to input a desired heating intensity or time. The input interface 300 may be variously implemented as a physical button or a touch panel. The input interface 300 may also be provided with a display panel configured to display a driving state of the induction heating device 1.

The input interface 300 may transmit the user's input to the first control module 310 and the first control module 310 may transmit the input to the above-described second control module 320 so that detailed description thereof will be made later.

The temperature sensor 330 may be configured to sense the temperature of the cover plate 119.

Specifically, the temperature sensor 330 may sense the temperature of the cover plate 119 and transmit information related to the sensed temperature of the cover plate 119 to the first control module 310.

The weight sensor 340 may sense the weight of a heating target placed on the upper surface of the cover plate 119. When a plurality of heating targets are placed on the upper surface of the cover plate 119, the weight sensor 340 may sense each of the heating targets. Two or more weight sensors 340 may be provided and disposed adjacent to the plurality of working coils WC.

The first control module 310 may receive information related to the temperature of the cover plate 119 from the temperature sensor 330, and may control whether to display a residual heat image of the input interface 300 based on the information about the temperature.

Specifically, the first control module 310 may control the driving of the input interface 300. That is, the input interface 300 may display a specific image based on a control command of the first control module 310.

Alternatively, the first control module 310 may receive a user's touch input from the input interface 300, and may transmit the received touch input to the second control module 320 or control or select a specific image displayed on the input interface 300 based on the received touch input.

The first control module 310 may be provided with information about the location of the heating target by the second control module 320, and may control or select a specific image displayed on the input interface 300 based on the provided information about the location of the heating target. In addition, the first control module 310 may control the input interface 300 to display an image of a plurality of burners based on the plurality of working coils WC and a heat power adjustment image for increasing or decreasing the heat power of each burner.

Meanwhile, the second control module 320 may be a controller configured to control the driving of the plurality of the working coils WC and select which one of the working coils WC a heating target is placed on.

As mentioned above, the second control module 320 may control the inverter and components related to the driving of the inverter, thereby controlling the driving of the working coils WC. In addition, the second control module 320 may transmit information about the sensed heating target location to the first control module 310, and receive a user's touch input from the first control module 310.

Of course, the second control module 320 may control the driving of the plurality of working coils WC based on the user's touch input transmitted from the first control module 310.

The plurality of working coils WC may be a heating module configured to heat a heating target, and may be provided inside the case 125.

Specifically, driving of the plurality of working coils WC may be controlled by the second control module 320. In other words, the plurality of working coils WC may be spaced a preset distance apart from each other as shown in FIG. 2.

For convenience of description, one working coil WC may be described as one example.

Specifically, the working coil WC may be formed in a conductive wire wound in an annular shape a plurality of times, and may generate an alternating magnetic field. A mica sheet and a ferrite core may be sequentially disposed under the working coil WC.

In addition, the ferrite core may be fixed to the mica sheet by a sealant, and may serve to spread an alternating current magnetic field generated from the working coil WC.

The mica sheet may be fixed to the working coil WC and the ferrite core by a sealant, and may prevent heat generated by the working coil WC from being directly transmitted to the ferrite core.

The induction heating device 1 according to an embodiment may also have a wireless power transmission function based on the above-described configuration and characteristics.

Recently, a technology for wirelessly supplying power has been developed and is being applied to many electronic devices. In electronic devices wireless power transmission technology is applied to, the battery is charged simply by placing it on a charging pad without connecting a separate charging connector. An electronic device to which the wireless power transmission is applied may not require a wired cord or charger, so portability may be improved and the size and weight may be reduced compared to the prior art.

The wireless power transmission technology largely includes an electromagnetic induction method using a coil, a resonance method using resonance, and a radio wave radiant method that converts electrical energy into microwaves and transmits them. Among them, the electromagnetic induction method is a technology for transmitting power using electromagnetic induction between a primary coil (e. g., a working coil) provided in a device for transmitting wireless power and a secondary coil provided in a device for receiving wireless power.

Of course, the induction heating method of the induction heating device 1 may have substantially the same principle as the wireless power transmission technology by electromagnetic induction in that the object to be heated is heated by electromagnetic induction.

Accordingly, in the case of the induction heating device 1 according to an embodiment of the present invention, as well as an induction heating function, a wireless power transmission function may be mounted. Furthermore, an induction heating mode or a wireless power transmission mode may be controlled by the first control module 310, and it is possible to selectively use the induction heating function or the wireless power transmission function as needed.

As described above, the induction heating device 1 according to an embodiment of the present disclosure may have the above-described configuration and characteristics. Hereinafter, a method for controlling the heating power of the induction heating apparatus 1 will be described.

Figure 4:
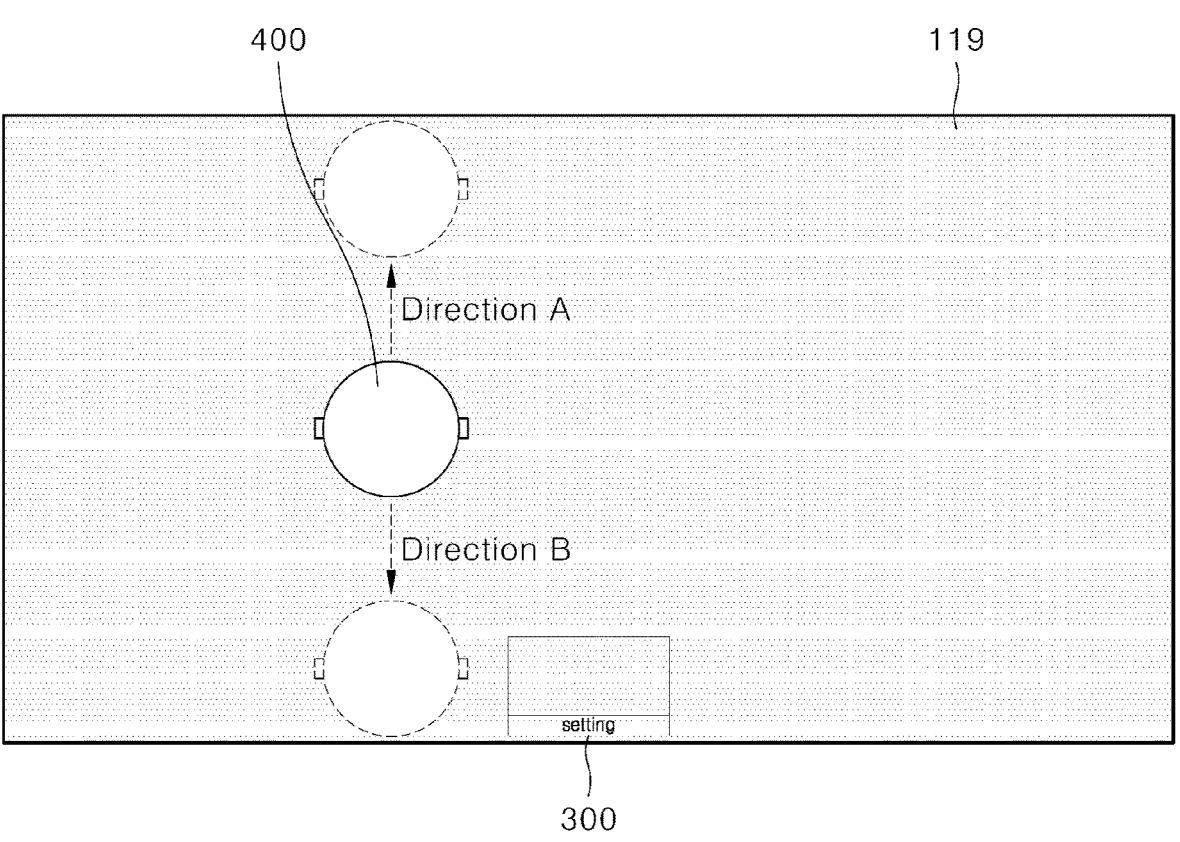
FIG. 4 is a view showing a state in which a heating target is moving on an upper surface of an induction heating device according to an embodiment.

FIG. 4 is a view showing a state in which a heating target 400 is moving on an upper surface of an induction heating device 1 according to an embodiment.

The heating target 400 (e.g., a pot) may be positioned at a first point on the upper surface of the cover plate 119, and may be heated by at least one of the working coils WC.

After that, the heated heating target 400 may be vertically moved by the user's gesture. Here, the vertical direction may include a direction A and another direction B. the direction A may be an upward direction among the vertical directions and the direction B may be a downward direction among the vertical directions. That is, the direction A may be opposite to the direction B.

Figure 5:
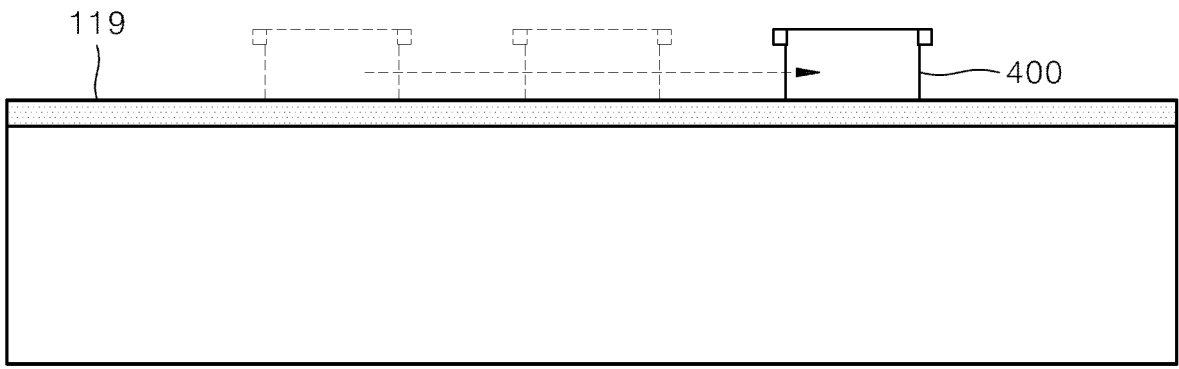
FIG. 5 is a view to describe the concept of moving a heating target according to an embodiment.

As shown in FIG. 4, the heating target 400 may be lifted and moved in the vertical direction (see FIG. 5 (*a*)) or sliding in the vertical direction (see FIG. 5 (*b*)).

According to the present disclosure, when the heating target 400 is vertically moved from the first point, the controller may set a heat power of the working coil WC disposed in the vertical direction based on information related to the heating target 400.

At this time, the information related to the heating target 400 may be information related to the properties of the heating target 400 that includes the weight of the heating target 400, the size of the bottom surface of the heating target 400 and at least one of the properties of the contents contained in the heating target 400.

According to an embodiment, the properties of the contents contained in the heating target 400 may include specific heat. As one example, the contents may be water-based food or oil-based food. In this instance, the sizes of the specific heats of the contents may be different from each other.

In the same manner as described above, the heating target 400 may be moved in the horizontal direction by the user's gesture, and the controller may set the heat power of the working coil WC disposed in the horizontal direction based on the information related to the heating target 400. In other words, the controller may set the heat power of the working coil WC disposed in a first direction (i.e., a vertical direction or a horizontal direction) based on the information related to the heating target.

Hereinafter, for convenience of description, the present disclosure will be described with reference to an example of setting a heat power of the working coil WC when the heating target 400 is moved in the vertical direction. However, the present disclosure is not limited thereto.

Referring to the accompanying drawings, the operation of the controller configured to set the heat power of the induction heating device 1 will be described in detail.

FIG. 6 is a flow chart of a method for controlling the induction heating device 1 configured to set a heat power of a working coil WC according to an embodiment.

Hereinafter, a process performed for each step will be described.

In S610, the controller may acquire information related to the heating target 400 positioned at a first point on the upper surface of the cover plate.

According to an embodiment, the information related to the heating target 400 may be the weight of the heating target 400.

In this instance, the weight of the heating target 400 may be sensed by the weight sensor 340 and the sensed weight may be transmitted to the controller.

According to another embodiment, the information related to the heating target 400 may be the size of the bottom surface of the heating target 400.

In this instance, the controller may measure the degree of attenuation of the resonance current flowing through the working coil WC and sense the size of the bottom surface of the working coil WC based on the degree of the attenuation.

That is, the size of the bottom surface of the heating target 400 may be detected based on a non-contact signal of the working coil WC.

According to a further embodiment, the information related to the heating target 400 may be the property (i.e., the specific heat) of the contents contained in the heating target 400.

In this instance, the input interface 300 may receive information about the kind of the food using the heating target 400 and transmit the received information to the controller. The controller may determine the specific heat of the contents contained in the heating target 400 based on the input information, that is, the information about the type or kind of the food.

As one example, a plurality of images corresponding to the information about the type of the food on the input interface 300, and the user may touch one of the displayed images, thereby selecting the type of the food. The controller may calculate the size of the specific heat of the contents contained in the heating target 400.

As one example, the plurality of images may include an image corresponding to boiling, an image corresponding to steaming, an image corresponding to frying, an image corresponding to grilling and the like.

In S620, the controller may set the heat power of the working coil WC disposed in the vertical direction based on the information related to the heating target 400.

At this time, the vertical direction may be an upward direction and a downward direction with respect to the first point.

Hereinafter, a process of S620 will be described in detail.

1. First Embodiment

According to the present disclosure, the controller may set to sequentially decrease the heat power of the working coil WC disposed in the vertical direction with respect to Point A on the vertical direction.

Figure 7:
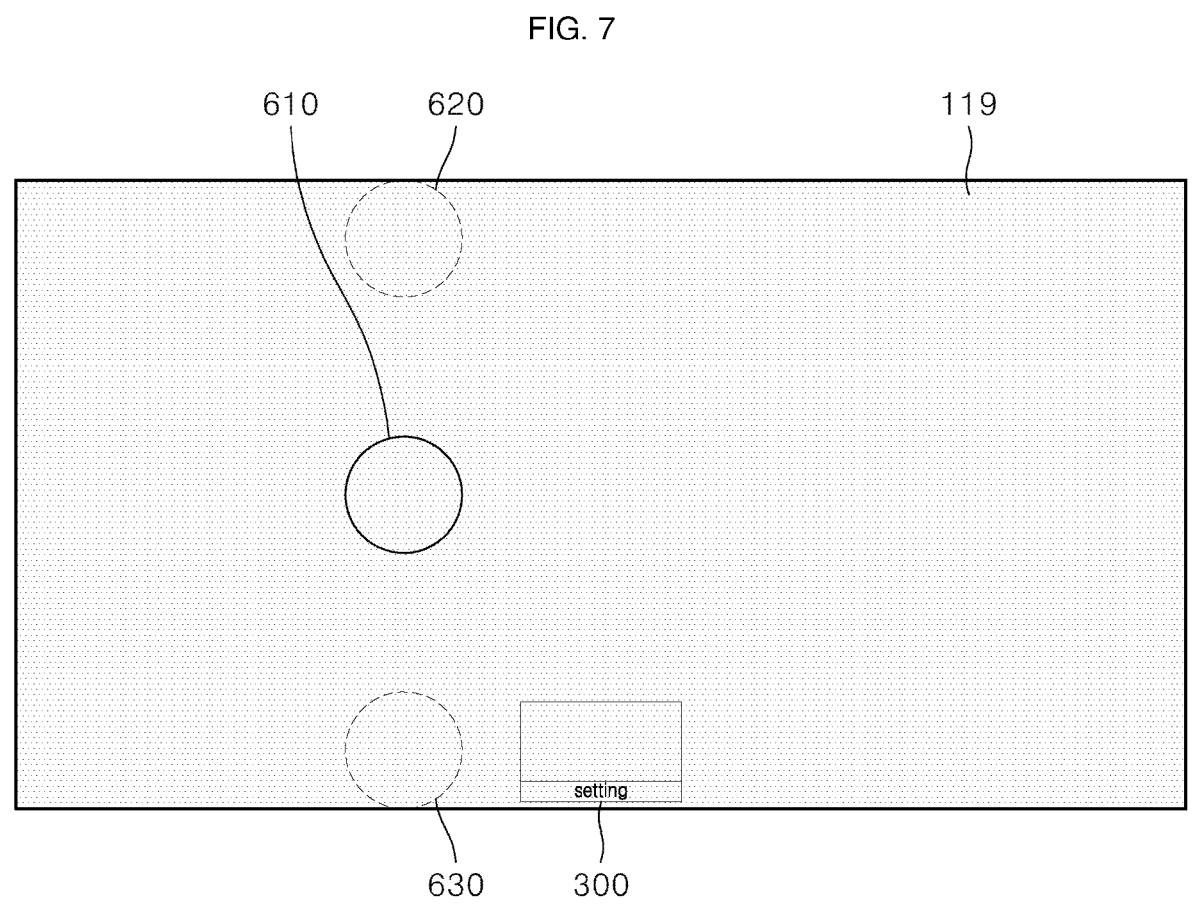

Referring to FIG. 7, Point A may be any one of a start point 720 in the vertical direction or an end point 730 in the vertical direction with respect to the first point 710.

A unit decrease amount value of the heat power sequentially decreased may be set based on the information related to the heating target 400.

According to an embodiment, when the information related to the heating target 400 is the weight of the heating target 400, the controller may set the unit decrease amount value of the heat power to be proportional to the weight of the heating target 400. Here, the unit decrease amount value of the heat power means a unit value when the heat power is decreased.

When the weight of the heating target 400 is heavy, the unit decrease amount value of the heat power may be set to a large value. When the weight of the heating target 400 is light, the unit decrease amount value of the heat power may be set to a small value.

Figure 8:
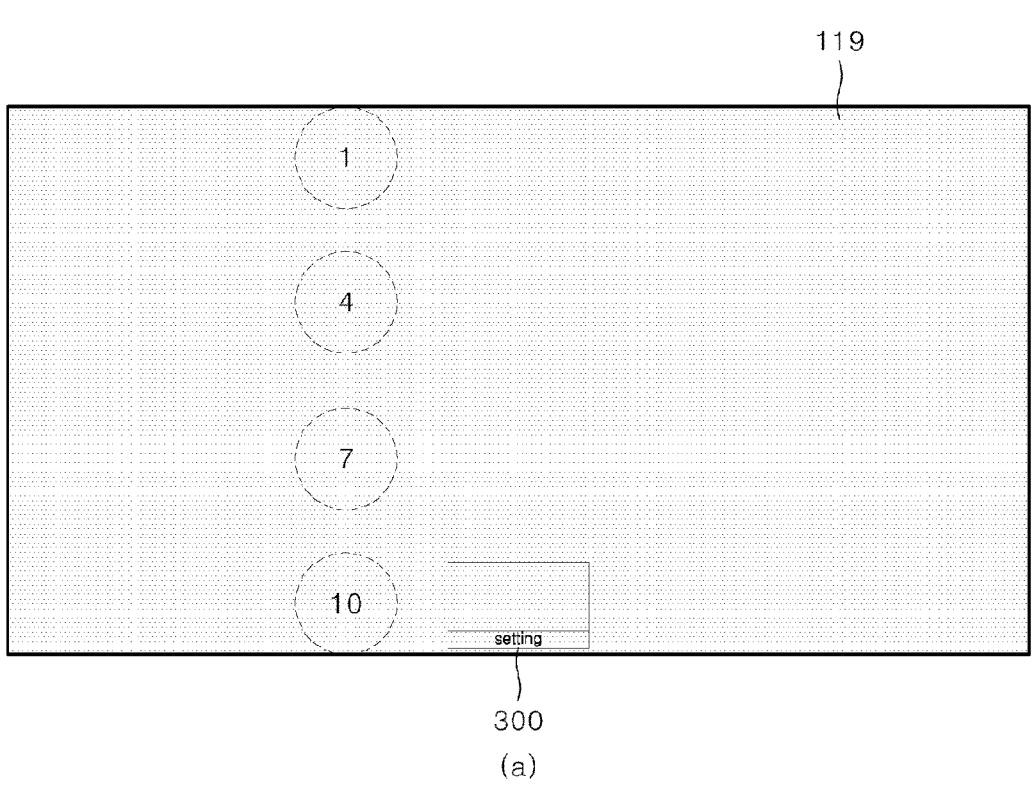
Figure 8:
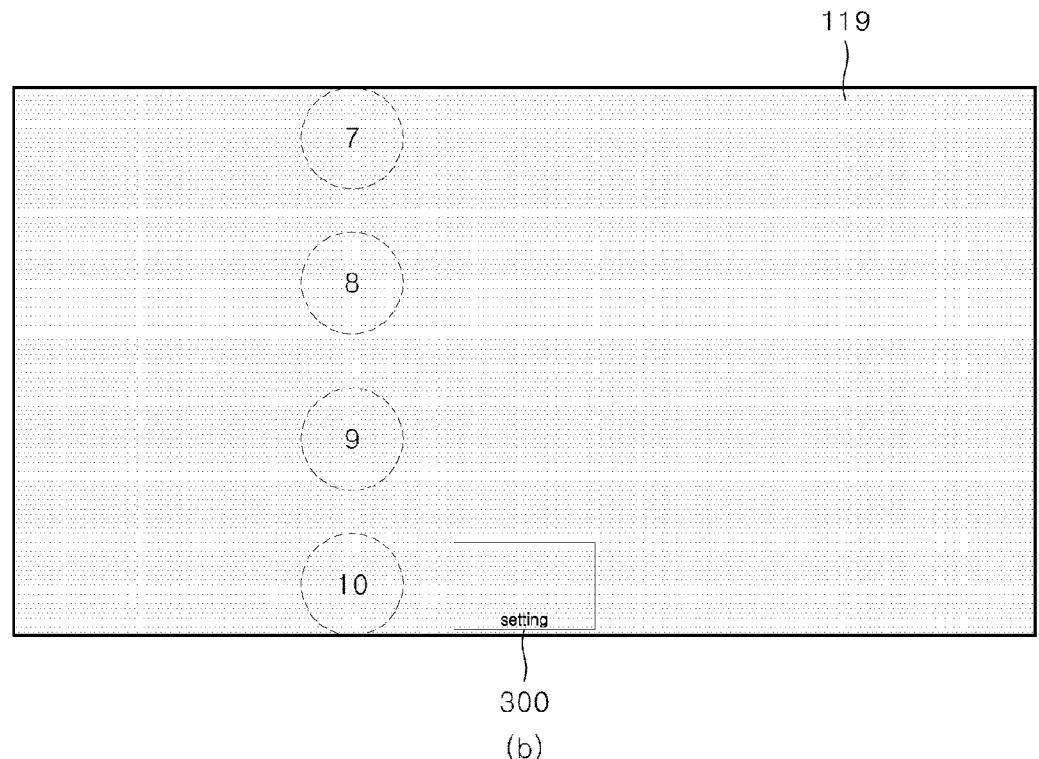
Figure 9:
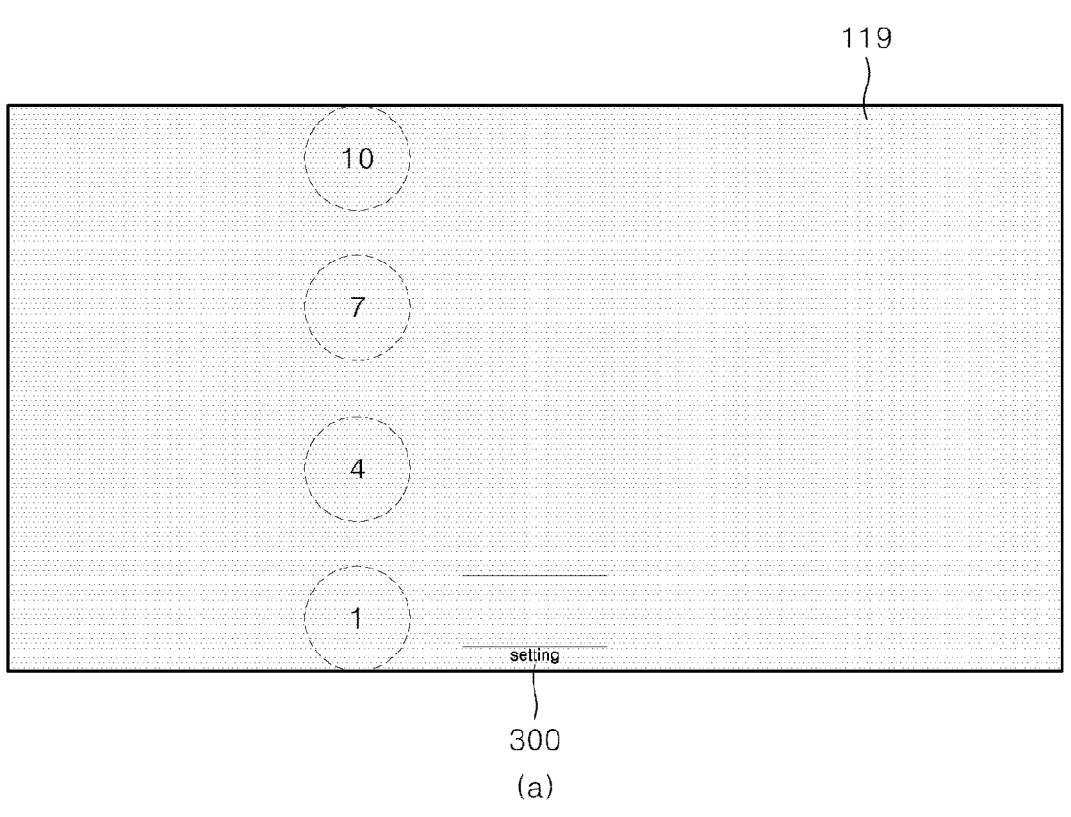
Figure 9:
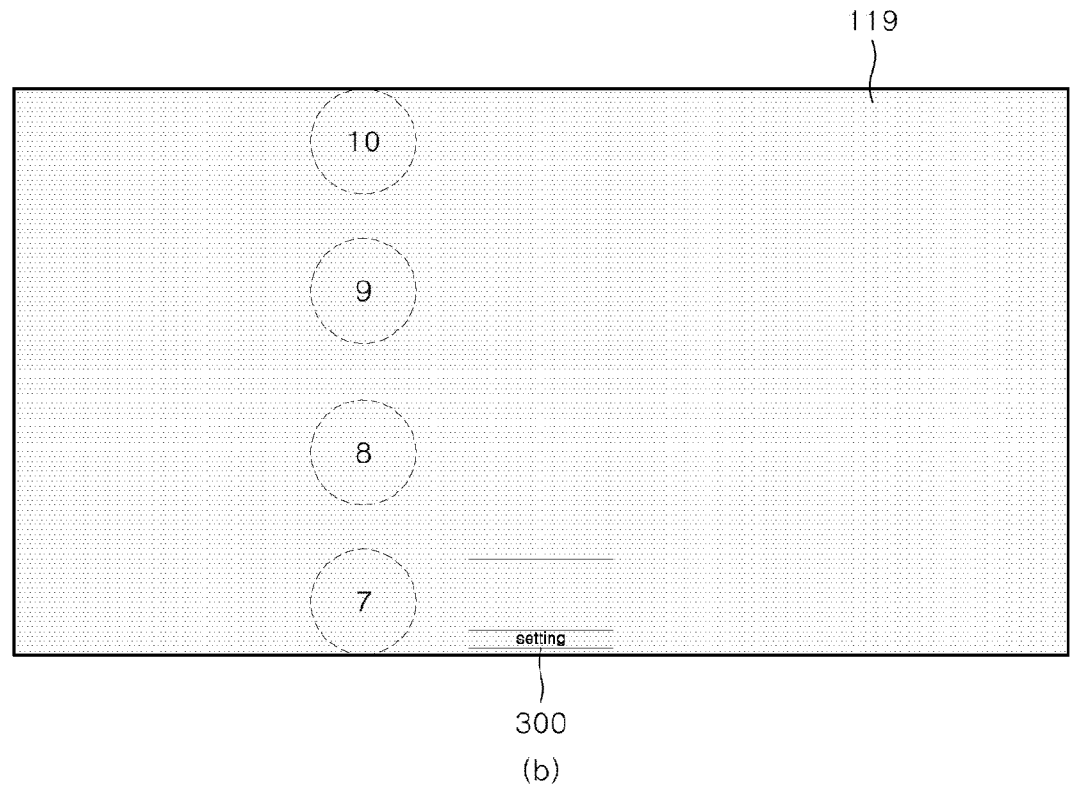

FIGS. 8 and 9 show a concept of setting a heat power of a working coil disposed in a vertical direction according to an embodiment.

In this instance, Point A of FIG. 8 is a start point of the vertical direction and Point A of FIG. 9 is an end point of the vertical direction.

Referring to FIGS. 8 and 9, when the weight of the heating target 400 is heavy, the working coil WC disposed in the vertical direction may be set to sequentially decrease to a unit value of "3" (see FIGS. 8 (*a*) and 9 (*a*)). When the weight of the heating target 400 is light, the working coil WC disposed in the vertical direction may be set to sequentially decrease to a unit value of "1" (see FIGS. 8 (*b*) and 9 (*b*)). That is, the controller may be set the unit decrease amount value to be proportional to the weight of the heating target 400.

According to another embodiment of the present disclosure, when the information related to the heating target 400 is the size of the bottom surface of the heating target 400, the controller may set the unit decrease amount value of the heat power to be proportional to the size of the bottom surface of the heating target 400. When the size of the bottom surface of the heating target 400 is large, the unit decrease amount value of the heat power may be set to be a large value. When the size of the bottom surface of the heating target 400 is small, the unit decrease value of the heat power may be set to be a small value.

As one example, when the heating target 400 has a large-sized bottom surface, the unit decrease amount value of the heat power may be "3", and when the heating target 400 has a small-sized bottom surface, the unit decrease amount value of the heat power may be "1". That is as shown in FIGS. 8 and 9. In other words, the controller may set the unit decrease amount value of the heat power to be proportional to the size of the bottom surface of the heating target 400.

According to a further embodiment of the present disclosure, when the information related to the heating target 400 is the property of the contents contained in the heating target 400 (i.e., the specific heat), the controller may set the unit decrease amount value of the heat power to be proportional to the size of the specific heat of the contents contained in the heating target 400.

Specifically, when the size of the specific heat of the contents contained in the heating target 400 is large, the unit decrease amount value of the heat power may be set to be a large value. When the size of the specific heat of the contents contained in the heating target 400 is small, the unit decrease amount value of the heat power may be set to be a small value.

As one example, when the size of the specific heat of the contents contained in the heating target 400 is large, the unit decrease amount value of the heat power may be "3". When the size of the specific heat of the contents contained in the heating target 400 is small, the unit decrease amount value of the heat power may be "1". That is as shown in FIGS. 8 and 9. In other words, the controller may set the unit decrease amount value of the heat power to be proportional to the size of the contents contained in the heating target 400.

In summary, the heating target 400 may be heated by the working coil WC at the first point, and if the heating continues for a long time, the contents (e.g., soup, oil, etc) contained in the heating target 400 might overflow and cause an emergency.

To prevent this situation, the induction heating device 1 according to the present disclosure may set the heat power of the working coil WC disposed in the vertical direction to sequentially decrease based on Point A in the vertical direction, and the user may move the heating target 400 in the vertical direction, thereby decreasing the heat power for heating the heating target 400.

To decrease the heat power more efficiently, the induction heating device 1 according to the present disclosure may set the unit decrease amount value of the sequentially decreasing heat power based on one of the weight of the heating target 400, the size of the bottom surface of the heating target 400 and the specific heat of the contents contained in the heating target 400.

More specifically, when the weight of the heating target 400 is a large value, with small change of heat power caused by the movement of the heating target 400, the contents contained in the heating target could not cool quickly. Accordingly, to cool the contents quickly, it is preferred to increase the unit change amount value of the heat power caused by the movement of the heating target 400. The induction heating apparatus 1 according to the present disclosure may set the unit heat power change amount value to be a large value to be a large value in proportion to the weight of the heating target 400.

When the bottom surface of the heating target 400 is large with a little change of the heat power caused by the movement of the heating target 400, the contents contained in the heating target 400 could not cool quickly. Accordingly, to cool the contents quickly, it is preferred to set a large unit change amount value of the heat power caused by the movement of the heating target 400. The induction heating device 1 according to the present disclosure may set the unit heat power change amount value to be a large value in proportion to the size of the bottom surface of the heating target 400.

When the specific heat of the contents contained in the heating target 400 is large (e.g., water), the temperature of the contents down not decrease much due to a small change in the heat power. In addition, when the specific heat of the contents contained in the heating target 400 is small (e.g., oil), the temperature of the contents may be greatly decreased even with a small change in the heat power. Accordingly, it is preferred to set the unit amount value of the heat power change caused by the movement of the heating target 400 to be in proportion to the specific heat of the contents contained in the heating target 400. The induction heating device 1 may set the unit heat power change amount value to be large in proportion to the specific heat of the contents contained in the heating target 400.

In short, the induction heating device 1 may quickly adjust the heat power. even when an emergency situation occurs in the process of heating and cooking, the induction heating device 1 may quickly solve the emergency situation through minimal manipulations, and may efficiently provide a desired level of the heat power to the user based on the weight, size and cooking type of the heating target 400.

2. Second Embodiment

According to the present disclosure, when the heating target 400 is moved to a second point from the first point in the vertical direction, the controller may set the heat power of the heating module disposed at the second point based on information related to the heat power of the heating module disposed at the first position, a distance between the first point and the second point and the heating target 400.

Here, the second point may be a point located on the upper surface of the cover plate, above the first point in the upward direction (Direction A) or a point located below the first point in the downward direction (Direction B). The information related to the heating target 400 may be one of the weight of the heating target 400, the size of the bottom surface of the heating target 400 and the specific heat of the contents contained in the heating target 400.

According to an embodiment, the controller may calculate a unit heat power change amount value based on the information related to the heating target 400 and a difference in the heat power between the first point and the second point based on the distance between the first point and the second point and the unit heat power change amount value.

Also, the controller may set the heat power of the heating module disposed at the second point based on a difference between the heat power of the heating module disposed at the first point and that of the heating module disposed at the second point.

More specifically, the controller may set the unit heat power change amount value based on one of the size, bottom surface size and contents of the heating target 400.

This may be a concept similar to the unit decrease amount value described above. As one example, when the second point is located above the first point in case the heat power of the working coil WC is set to sequentially decrease with respect to the start point 720 in the vertical direction (see FIG. 8), the unit heat power change amount value may be a unit heat power decrease amount value, and when the second point is located below the first point, the unit heat power change amount value may be a unit heat power change increase amount value.

Since the description of "setting the heat power change amount value" is similar to the description of "setting the unit decrease amount value of the heat power described above, a detailed description thereof will be omitted.

Next, the controller may calculate a difference between the heat power at the first point and the heat power at the second point based on the distance between the first point and the second point and the unit heat power change amount value. That is, the controller may calculate a difference in the heat power between the first point and the second point by multiplying the distance between the first point and the second point by the unit heat power change amount value.

As one example, when the second point is located above the first point and the distance between the first point and the second point is "2" of the unit distance and the unit heat power change amount value (i.e., the unit decrease amount value) is "2", the difference in heat power calculated by the controller may be "−4".

Finally, the controller may set the heat power of the heating module disposed at the second point based on the heat power of the heating module disposed at the first point and the difference in the heat power. In other words, the controller may set the heat power of the heating module disposed at the second point by multiplying the heat power of the heating module disposed at the first point and the different in the heat power.

As one example, when the heat power of the heating module disposed at the first point is "6" and the heat power difference is "−4", the controller may set the heat power of the heating module disposed at the second point to be "2".

In short, the induction heating device according to the second embodiment of the present disclosure may also set the heat power of the heating module disposed at the second point based on the heat power of the heating module disposed at the first point, the distance between the first point and the second point and the information related to the heating target 400, in order to prevent the emergency of overflowing the contents contained in the heating target 400.

Accordingly, only the user's manipulation of moving the heating target 400 may quickly reduce the heat power so that the emergency may be quickly resolved, and the user's desired degree of the heat power may be provided based on the weight, size and cooking food type of the heating target 400.

Embodiments of the present disclosure may be implemented in the form of program instructions that can be executed through various computer means and recorded in a computer-readable medium. The computer-readable medium may include program instructions, data files, data structures and the like, alone or in combinations.

The embodiments are described above with reference to a number of illustrative embodiments thereof. However, the present disclosure is not intended to limit the embodiments and drawings set forth herein, and numerous other modifications and embodiments can be devised by one skilled in the art. Further, the effects and predictable effects based on the configurations in the disclosure are to be included within the range of the disclosure though not explicitly described in the description of the embodiments.

What is claimed is:

1. An electric range, comprising:
   a case;
   a cover plate coupled to an upper side of the case and having an upper surface on which a heating target is disposed;
   a plurality of heating modules disposed inside the case and configured to heat the heating target, each of the plurality of heating modules including a coil; and
   at least one controller configure to control the plurality of heating modules, wherein the heating target is positioned at a first point on an upper surface of the cover plate and heated by a heating module of the plurality of heating modules disposed at the first point, and wherein when the heating target is moved to a second point from the first point on the upper surface of the cover plate, the at least one controller sets a heat power of a heating module of the plurality of heating modules disposed at the second point to decrease in proportion to a distance between the first point and the second point.

2. The electric range of claim 1, wherein the first point and the second point are provided in a first direction, and the first direction is any one of a vertical direction and a horizontal direction.

3. The electric range of claim 1, further comprising:
   a weight sensor disposed on a lower surface of the cover plate and configured to sense a weight of the heating target, wherein the at least one controller calculates a unit change amount value of the heat power to be proportional to the weight of the heating target.

4. The electric range of claim 1, wherein the at least one controller calculates a unit change amount value of the heat power to be proportional to a size of a bottom surface of the heating target.

5. The electric range of claim 1, further comprising:
   an input interface disposed on the upper surface of the cover plate and configured to display a specific image and receive a user's touch input, wherein the input interface receives information about a food cooking type using the heating target, the at least one controller determines a specific heat of a contents based on the information about the food cooking type, and the at least one controller calculates a unit change amount value of the heat power in proportion to a size of the specific heat of the contents.

6. The electric range of claim 1, wherein the at least one controller comprises:
   a first controller that controls an input interface and communicates with a plurality of sensors; and
   a second controller that controls the plurality of heating modules and communicates with at least one sensor of the plurality of sensors and the first controller.

7. The electric range of claim 6, wherein the plurality of sensors comprises:
   a temperature sensor configured to sense a temperature of the cover plate; and a weight sensor configured to sense a weight of the heating target.

8. The electric range of claim 6, wherein the at least one sensor comprises:

a weight sensor configured to sense a weight of the heating target.

9. A method of controlling an electric range, the method comprising:

acquiring, via at least one controller, information related to a heating target positioned at a first point on an upper surface of a cover plate; and setting, via the at least one controller, a heat power of a heating module disposed at the first point, wherein the heating target is positioned at the first point on the upper surface of the cover plate and heated by the heating module; and when the heating target is moved to a second point from the first point on the upper surface of the cover plate, setting, via the at least one controller, a heat power of a heating module disposed at the second point to decrease in proportion to a distance between the first point and the second point.

10. The method of claim 9, wherein the first point and the second point are provided in a first direction, and the first direction is any one of a vertical direction and a horizontal direction.

11. The method of claim 9, wherein the at least one controller comprises:

a first controller that controls an input interface and communicates with a plurality of sensors; and a second controller that controls the plurality of heating modules and communicates with at least one sensor of the plurality of sensors and the first controller.

12. The method of claim 11, wherein the plurality of sensors comprises:

a temperature sensor configured to sense a temperature of the cover plate; and a weight sensor configured to sense a weight of the heating target.

13. The method of claim 11, wherein the at least one sensor comprises:

a weight sensor configured to sense a weight of the heating target.

* * * * *